UNITED STATES PATENT OFFICE.

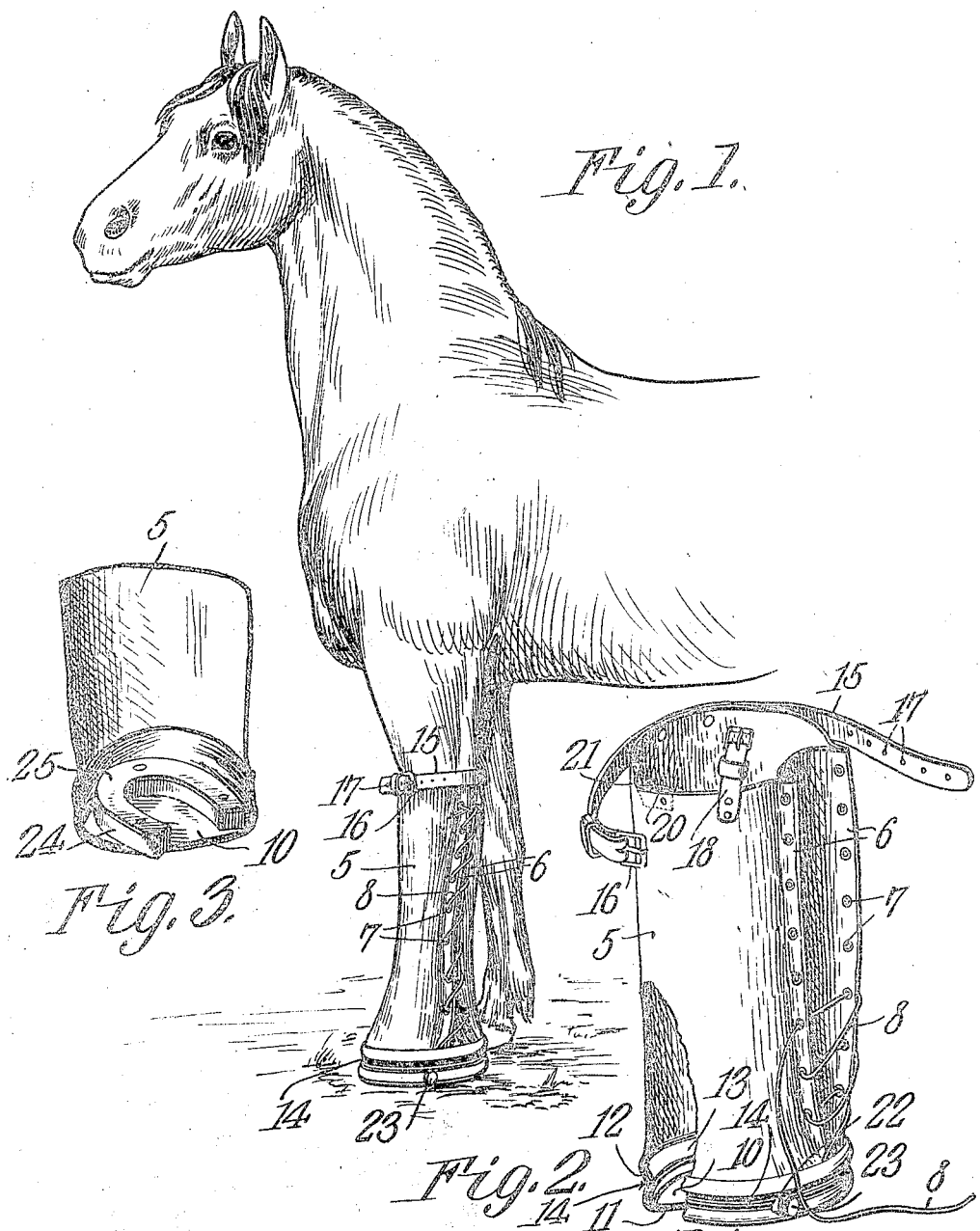

HARRY R. O'BRIAN AND JOHN R. COULTER, OF OXFORD, OHIO.

FOOT AND LEG BATH FOR HORSES.

No. 874,983.    Specification of Letters Patent.    Patented Dec. 31, 1907.

Application filed February 18, 1907. Serial No. 357,973.

*To all whom it may concern:*

Be it known that we, HARRY R. O'BRIAN and JOHN R. COULTER, citizens of the United States, residing at Oxford, in the county of Butler and State of Ohio, have invented a new and useful Foot and Leg Bath for Horses and other Live Stock, of which the following is a specification.

This invention relates to foot baths for horses and other live stock and has for its object to provide means for applying liquid or powdered medicament to the leg or hoof of the animal in the treatment of sore feet, quarter crack, ring bone and other diseases of or injuries to the leg and hoof of the animal.

A further object of the invention is to provide a flexible liquid containing bag or receptacle having means for attachment to the leg of the animal so that a medicated liquid may be applied to the affected parts while the animal is standing in the stall.

A further object is to provide means for removing the liquid or powder from or supplying the same to the receptacle without the necessity of detaching said receptacle from the animal's leg.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a foot bath constructed in accordance with my invention and showing the same in position on a horse. Fig. 2 is a perspective view partly in section of the liquid-containing receptacle or bath detached. Fig. 3 is a perspective view showing the foot pad in position.

Similar numerals of reference indicate corresponding parts in all of the figures of the drawings.

The device consists of a flexible containing vessel or bag 5 preferably formed of canvas, leather or other suitable water proof material and having its side walls folded laterally to form spaced longitudinal reinforcing ribs 6, the latter being pierced by suitable eye-lets 7 for the reception of a fastening cord or string 8.

The bottom 10 of the receptacle consists of a pair of superposed metallic plates 10 and 11 having their peripheral edges bent upwardly to form vertically disposed flanges 12 and 13 between which is interposed the adjacent end of the canvas, leather or other material constituting the flexible walls of the bag or receptacle, the flanges 12 and 13 being bent inwardly or crimped to produce a marginal bead 14 and thus prevent accidental displacement of the side walls of the receptacle.

Secured to the upper or free edge of the receptacle is a strap 15 having one end thereof provided with a buckle 16 while its opposite end is formed with spaced openings 17 adapted to receive the tongue of the buckle whereby the receptacle may be secured in position on the leg of the animal. A short strap 18 is also preferably secured to the upper edge of the receptacle for attachment to the harness or for connection with a strap extending over the shoulder of the animal in case the strap 15 cannot be positioned on the leg of the animal by reason of an injury thereto in proximity to said strap.

Riveted or otherwise rigidly secured to the interior walls of the bag or receptacle at the open end thereof is a metal plate 20 having its upper edge extended laterally beyond the vertical walls of the receptacle to form a filling spout 21 by means of which liquid may be introduced into the receptacle while the latter is in position on the leg of the animal.

The flanges 12 and 13 are pierced by a drain opening 22 whereby the contents of the receptacle may be conveniently removed therefrom, said opening being normally closed by a threaded plug or valve 23.

Disposed within the receptacle is a removable foot pad preferably formed in two sections 24 and 25, the lower section 24 being preferably formed of felt or other yieldable material and the upper section of leather. The pad serves to elevate the animal's hoof above the bottom of the receptacle so as to relieve the weight of the animal from the frog of the hoof and at the same time permit the liquid or other medicament to come in contact therewith when treating an injury to the same.

In using the foot bath the pad is introduced in the receptacle and the latter placed in position on the front or hind leg of the animal, as the case may be, with the strap 15 embracing the animal's leg after which the flexible material forming the side walls of the receptacle is drawn around the leg of the animal by exerting a longitudinal pull on the cord or string 8, as best shown in Fig. 1 of the drawing. The liquid or powdered medicament is then introduced within the receptacle through the filling spout 21 so that the contents of the receptacle may come in contact with the injured or diseased portion of the leg or hoof. The liquid in the receptacle may be withdrawn therefrom without detaching the receptacle from the leg of the animal by merely removing the plug or valve 23 and allowing the fluid to drain through the opening 22. If the liquid in the receptacle evaporates or the strength thereof becomes impaired or diminished additional liquid may be added to the bath through the filling spout 21 in the manner before stated. Attention is called to the fact that the drain orifice is disposed in alinement with the open end of the foot pad so that the entire contents of the receptacle may be removed.

From the foregoing description it will be seen that there is provided an extremely simple, inexpensive and efficient device admirably adapted for the attainment of the ends in view.

Having thus described the invention what is claimed is:

1. A foot bath for live stock including a flexible receptacle having means for attachment to the leg of an animal, spaced reinforcing plates constituting the bottom of the receptacle and having their peripheral edges bent upwardly to produce vertically disposed flanges, the side walls of the receptacle being interposed between the flanges and the several parts crimped together to form a circumferential bead.

2. A foot bath for live stock including a receptacle having flexible side walls and a reinforced bottom, the side walls of the receptacle being extended laterally to form longitudinal ribs, eye-lets piercing the ribs, a lacing strip threaded through the eye-lets, and a strap secured to the walls of the receptacle and adapted to embrace the leg of an animal.

3. A foot bath for live stock including a flexible receptacle having its bottom reinforced and formed of spaced metallic plates, the peripheral edges of which are bent upwardly and spaced apart for the reception of the side walls of the receptacle, and the several parts crimped together to form a circumferential bead there being a drain opening formed in the up-turned ends of the reinforced plates, a valve seated in the drain opening, and a strap secured to the receptacle for securing the latter in position on the leg of an animal.

4. A foot bath for live stock including a flexible receptacle, spaced plates constituting the bottom of the receptacle and having their peripheral edges bent upwardly to form vertically disposed flanges, the side walls of the receptacle being interposed between said flanges and the latter crimped to form a circumferential bead, there being a drain opening formed in the flanges and communicating with the interior of the receptacle, a strap secured to the upper end of the receptacle for securing the latter in position on the leg of an animal, and a plug for normally closing the drain opening.

5. A foot bath for live stock including a receptacle having flexible side walls and a reinforced bottom, a filling spout secured to the open end of the receptacle, a drain opening formed in the lower end of the receptacle, a plug normally closing the drain opening, an attaching strap secured to the open end of the receptacle and adapted to embrace the leg of an animal, and an auxiliary strap secured to said receptacle and disposed at substantially right angles to the attaching strap.

6. A foot bath for live stock comprising a receptacle adapted to contain a medicament and having means for attachment to the leg of an animal, and a yieldable foot pad disposed within the receptacle and conforming to the shape of the hoof of the animal.

7. A foot bath for live stock, comprising a receptacle having a reinforced bottom and provided with means for attachment to the leg of an animal, a hollow foot pad resting on the bottom of the receptacle, and conforming to the shape of the hoof of the animal and a drain orifice formed in the walls of the receptacle at said foot pad to permit the discharge of liquid at the base of the foot pad.

In testimony that we claim the foregoing as our own, we have hereto affixed our signatures in the presence of two witnesses.

HARRY R. O'BRIAN.
JOHN R. COULTER.

Witnesses:
 ROBERT BUCKNER,
 L. D. HOUSE.